(12) United States Patent
Martin

(10) Patent No.: US 6,785,541 B2
(45) Date of Patent: Aug. 31, 2004

(54) CELLULAR/PCS MANAGEMENT SYSTEM AND METHOD

(75) Inventor: Dannie E. Martin, Casselberry, FL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 652 days.

(21) Appl. No.: 09/729,720

(22) Filed: Dec. 6, 2000

(65) Prior Publication Data

US 2001/0036825 A1 Nov. 1, 2001

(51) Int. Cl.[7] .................................................. H04Q 7/20
(52) U.S. Cl. .......................... 455/423; 455/9; 455/424; 455/425; 455/67.11
(58) Field of Search ................................ 455/424, 423, 455/425, 67.11, 67.7, 67.13, 561, 404.2, 550, 456.1, 8, 9, 115.1, 115.2, 115.3, 115.4

(56) References Cited

U.S. PATENT DOCUMENTS

| | | | | |
|---|---|---|---|---|
| 5,752,165 A | * | 5/1998 | Hokkanen | 455/67.11 |
| 5,884,163 A | * | 3/1999 | Hardouin | 455/423 |
| 6,070,072 A | * | 5/2000 | Dorenbosch et al. | 455/423 |
| 6,070,091 A | * | 5/2000 | Hogevik | 455/561 |
| 6,215,997 B1 | * | 4/2001 | Han | 455/423 |
| 6,223,032 B1 | * | 4/2001 | Cuffaro | 455/425 |
| 6,298,233 B1 | * | 10/2001 | Souissi et al. | 455/423 |
| 6,389,281 B1 | * | 5/2002 | Lee | 455/423 |
| 6,587,686 B1 | * | 7/2003 | Cuffaro et al. | 455/423 |

FOREIGN PATENT DOCUMENTS

| | | |
|---|---|---|
| EP | 0 806 880 | 11/1997 |
| WO | WO 99/16274 | 4/1999 |
| WO | WO 99/53703 | 10/1999 |
| WO | WO 00/11884 | 3/2000 |

OTHER PUBLICATIONS

Digital Cellular Communications System (Phase 2+); Peformance Data Measurements (GSM 12.05 version 7.0.0 Release 1998) Feb. 2000–2002.

Lin, Y–B, "OA&M for the GSM Network", IEEE Network, vol. 11, No. 2, Mar.1, 1997.

Scmid E.H. et al. "GSM Operation and Maintenance" Electrical Communication, 1993.

* cited by examiner

*Primary Examiner*—Cong Van Tran
(74) *Attorney, Agent, or Firm*—Cantor Colburn LLP

(57) ABSTRACT

A method and system for detecting failures in a wireless communications network. A computer is programmed to remotely access a platform, such as a network switch or database, that stores data indicative of the performance of the wireless communications network infrastructure. The computer downloads the data, parses the data to extract wireless communications network events such as dropped calls, noise or lack of audio, sorts the events, and passes the events through an event-to-failure mapping module to identify probable network component failures. Data is preferably analyzed over periods of less than 24 hours. The probable failures are preferably reported to network operations personnel who can then resolve the failures on a more timely basis.

38 Claims, 3 Drawing Sheets

EMAIL MESSAGE

To: _____

From: _____

Based on information collected on May 14, 2000, from 12:00:00 to 16:00:00, RF channel 956 at cell site 90 has failed.

| Site | Error | Diagnostic | Freq/Channel | # of Occurrences |
|---|---|---|---|---|
| 90 | loss of SAT | low S/N | 956 | 247 |

Figure 3

CELLULAR/PCS MANAGEMENT SYSTEM AND METHOD

BACKGROUND

1. Field of the Invention

The present invention is directed to managing wireless communications networks and, specifically, cellular and/or personal communication system (PCS) networks (hereinafter, collectively, "cellular network(s)" or "cellular system(s)"). More particularly, the present invention is directed to monitoring events in a cellular network and associating a particular event or series of events with a likely type of failure in the cellular system, thereby preempting failures or quickly detecting failures.

2. Background of the Invention

Demand for cellular system capacity has grown substantially over recent years and growth continues even today. To accommodate this ever increasing demand, new cellular antennas and switches are being fielded, along with associated cabling and other infrastructure necessary to support expansion of the network.

However, as the cellular system grows, so do the number of problems or failures that tend to occur in the network. That is, even though failures may not be particularly common in any single piece of equipment, the more such equipment is placed in the field, the more likely failures will tend to occur in the aggregate. Unfortunately, this increased number of failures can overburden available technicians and cellular system management personnel and engineers.

More particularly, it is often the case that the underlying cause of a particular failure in the cellular system is not known at the time the failure is detected. For example, when a single channel at a cell site begins to fail or fails, the failure can, under certain circumstances, cause "ripple" effects throughout the entire cell site, making it appear as though there is a problem with the entire cell site. That is, the fact that the failure is related to only one channel may not be immediately apparent to the cellular system operator. It is not until a technician is dispatched to the cell site to troubleshoot the failure that it is discovered that the underlying cause of the failure was, in fact, the failure of only a single channel module, and that the replacement of that one module will rectify the overall problem.

Also, a cellular system failure may sometimes go unnoticed by the cellular system operator until cellular system customers begin complaining about spotty or inadequate service.

In other words, under conventional cellular system management system, it is often difficult to timely detect and determine the source or cause of a problem or failure without having to rely on system customers or having to dispatch technicians to apparent trouble spots. Furthermore, due to the limited number of properly trained technicians, there may not be a suitable technician who is readily available to troubleshoot system failures.

SUMMARY OF THE INVENTION

The present invention provides a method and system to more effectively manage and/or monitor a cellular or PCS system or network. In accordance with the present invention, the network is monitored using event data that is available from the system infrastructure itself, including infrastructure data such as billing data, blocking statistics, call processing data, call activity counters, system alarm information and any other event data that can be collected and analyzed in accordance with the principles of the present invention. In the context of the present invention, billing data includes calling and called party telephone numbers and length of call, and blocking statistics include the number and frequency of calls initiated by a cellular system user that cannot be processed as a result of the cellular system being too busy. Call processing data includes, for example, cell site handoff data, call activity counters including counters for RF cell loss or high BER, and alarms including autotune combiner failures or power amplifier failures.

In accordance with the present invention, a computer is programmed to perform the tasks of remotely accessing a cellular switch (or database) and downloading data that is available from the cellular system infrastructure. The downloaded data is then parsed to capture particular events that have been found to be relevant to cellular system operation. Such events include, for example, blocked calls, dropped calls, noise, lack of audio, one-way audio or any other event that detrimentally impacts a cellular system customer. The events just described are, in accordance with the present invention, gleaned from the information or data available from the cellular system infrastructure.

The events gleaned from the cellular system infrastructure via parsing are then analyzed with respect to a predetermined event-to-failure "mapping" or "correlation" scheme. For example, through empirical experimentation, the present inventor has recognized that certain types of failures can be detected by analyzing the information that is available from the cellular system infrastructure. Using billing data along with call processing data, for example, one can find instances of cellular telephone calls that last only a short period of time, e.g., 5 to 7 seconds, and which are initiated and ended by the same cellular telephone user. Such short telephone calls can often be attributed to problems with a channel's audio signal. By detecting short calls of this nature and counting how may similar telephone calls are begun and ended in such a fashion over a predetermined period of time, it is often possible to predict, with considerable certainty, that a channel's audio signal is about to fail or has already failed.

In the preferred embodiment of the present invention, once a likely or possible failure in the cellular system is detected, a person responsible for tending to or managing the resolution of that particular type of failure is notified by, for example, email, telephone, wireless telephone or pager, or other PCS device. The failure or potential failure can then be tended to in a timely and efficient manner.

In the preferred embodiment of the present invention, the aforementioned information and/or data is captured in real or near-real time over a predetermined period of time (e.g., 4, 6 or 8 hour periods) and analyzed preferably immediately thereafter so that analysis results are quickly made available to the appropriate personnel. Quantized periods of time are preferably employed since the information available from the cellular system infrastructure is considerable and, accordingly, it may be beneficial, in view of limited computing power, for example, to limit the amount of data that is being analyzed at any given time. Further, by performing event-to-failure mapping after a relatively short period of time, failures can be more quickly identified.

It is therefore an object of the present invention to provide a method and system that collects cellular system infrastructure information and/or data, extracts cellular system events therefrom and maps the extracted events into indications of possible or likely cellular system failures.

It is yet another object of the present invention to provide a method and system that notifies the appropriate person when a failure is detected.

It is another object of the present invention to provide a method and system that analyzes aspects of at least one of billing information, blocking statistics, call processing data, counter information and alarm information available via the cellular system infrastructure in an effort to quickly identify probable failures.

It is also an object of the present invention to provide a method and system that captures cellular system information in blocks of time and analyzes the information with respect to possible indications of system failures.

It is another object of the present invention to provide a method and system for analyzing cellular system infrastructure data, detecting possible failures and notifying the appropriate manager or technician responsible for resolving such a failure.

These and other objects of the present invention will become apparent upon a reading of the following detailed description in conjunction with the accompanying drawings.

BRIEF DESCRIPTION OF THE DRAWINGS

FIG. 3 is an exemplary email message sent in accordance with the notification features of the present invention.

DETAILED DESCRIPTION OF THE INVENTION

Figure 1:
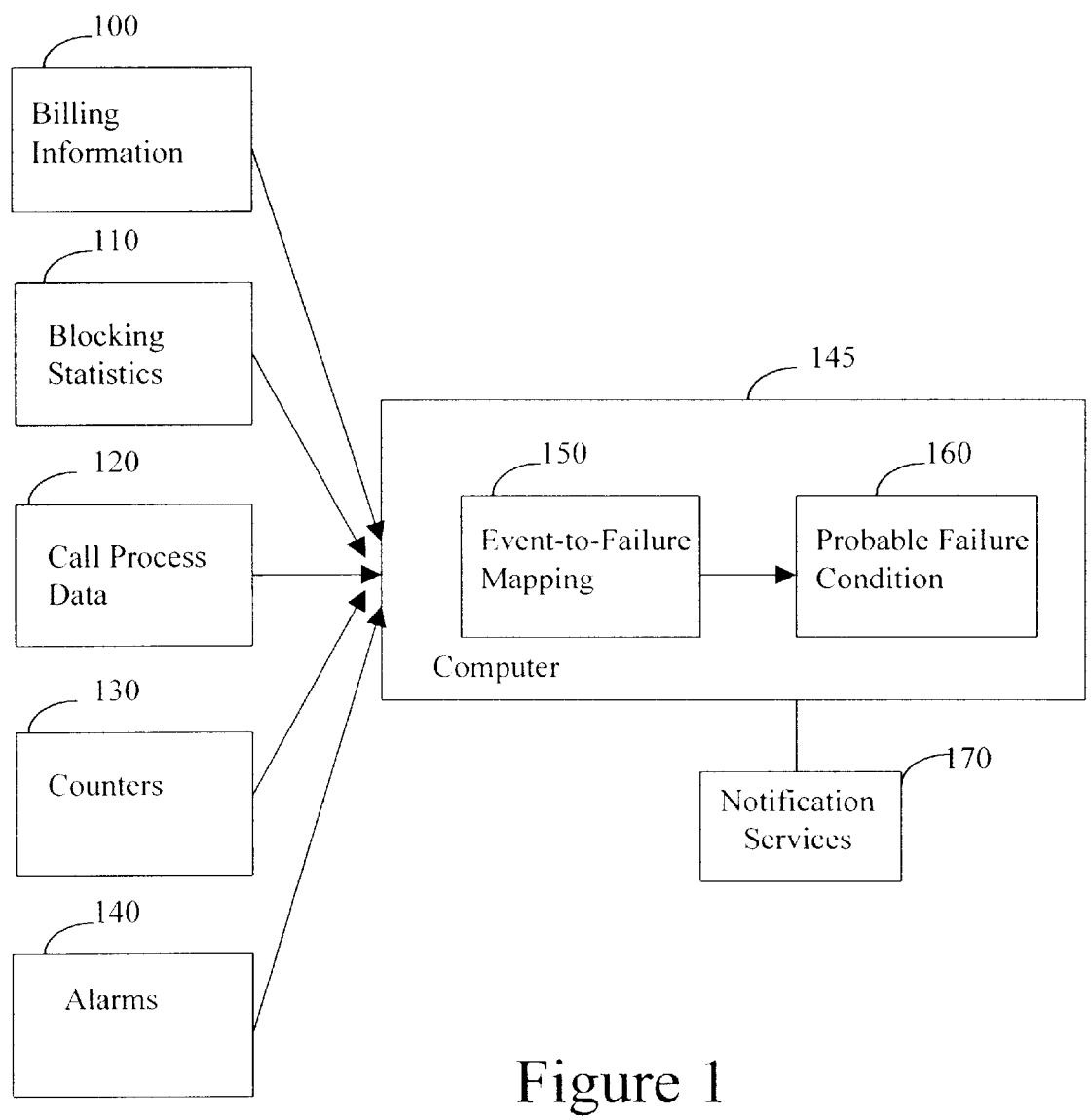
FIG. 1 is a schematic diagram illustrating an exemplary system for collecting cellular infrastructure information and identifying a probable failure via event-to-failure mapping, in accordance with the present invention.

The present invention provides a method and system to more effectively manage and/or monitor a cellular or PCS system or network. In accordance with the preferred embodiment of present invention, events in the network are monitored using information or data that is available from the system infrastructure itself. FIG. 1 shows an exemplary system architecture in accordance with the present invention. The figure illustrates the type of data that the present invention preferably collects and the general flow of this data or information in accordance with the principles of the present invention. As shown, billing information 100, blocking statistics 110, call process data 120, counter information 130 and system alarm information 140, or some subset of this data, are passed to event-to-failure mapping module 150, which is, for example, a software program running on computer 145. The foregoing data can be collected in real or near-real time primarily from cellular system switches and/ or databases associated with cellular switches, by remotely connecting computer 145 to the switches and downloading data that has been recorded at the switch and the associated databases. Methods for implementing such connectivity to a cellular switch, for example, are well-known to those skilled in the art. Also, as shown in FIG. 1, computer 145 is connected to notification service 170, which may be an email server, paging service or the like.

Event-to-failure mapping module 150 preferably collects the various forms of data and, through filtering, ordering and data association techniques, maps an event or a series of events to probable or actual failures in the cellular network. By collecting different types of data from the various sources 100–140, it is possible to identify possible points of failure. Examples of event-to-failure mapping are described later herein.

The output of event-to-failure mapping module 150 is the identification of a probable failure 160. This probable failure is then preferably reported to a cellular system manager or technician, for example, who is responsible for resolving the identified failure. For example, if a cellular site channel is determined from the present invention to have failed, then a technician is preferably notified that, e.g., channel X at cell site Y should be replaced.

Figure 2:
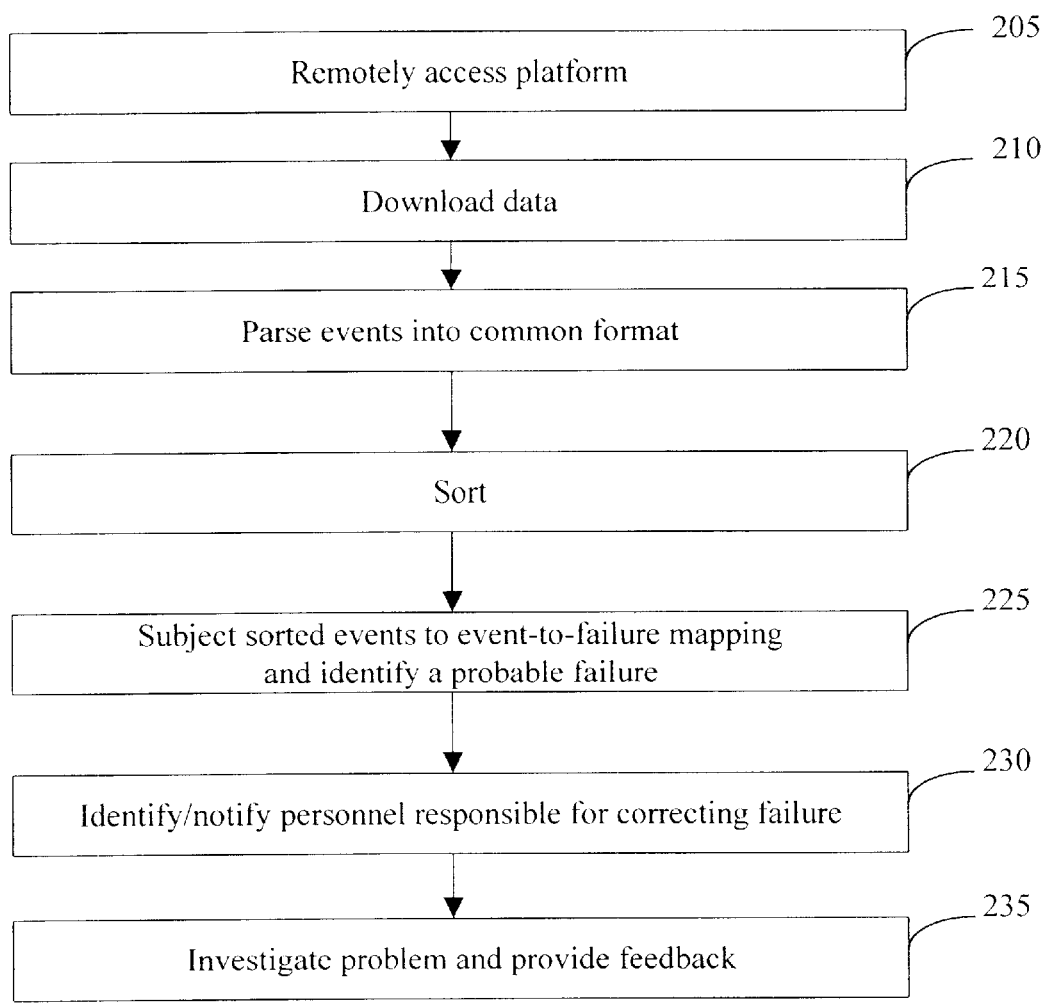
FIG. 2 is a flowchart illustrating the preferred steps for implementing the present invention.

The present invention will now be explained in more detail with reference to FIG. 2, which illustrates exemplary steps for implementing the present invention. At step 205 a "platform" that stores, records or holds data or information with respect to the cellular system infrastructure is accessed. The "platform" may be a hard drive or dynamic random access memory (RAM) at a cellular switch, a database at a location other than a cellular switch, or any other data source that stores cellular system infrastructure information. In the preferred embodiment of the present invention, computer 145 is programmed to perform step 205 as well as the other steps described herein. At step 210, data is accessed and downloaded from the platform. This accessing and downloading step can be accomplished via, for example, a wire line network employing the Internet using FTP or HTTP, or any other suitable protocol for setting up a connection between a computer and a data source (typically another electronic computing device) for purposes of accessing and downloading data.

At step 215, the downloaded data is then parsed to capture information corresponding to cellular system infrastructure events that have been determined to be particularly relevant to cellular system operation. Accordingly, cellular system information tending to provide insight into, for example, blocked calls, dropped calls, noise, lack of audio, or one-way audio are preferably extracted and stored separately from the rest of the available data. Such information can be gleaned from, for example, call release/block data including:

1. Normal Release
2. Call Blocked, no RF Channels available
3. Call Blocked, no Telco trunks available
4. Call rejected, bad ESN/MIN combo (Electronic Serial Number)/(Mobile Identification Number)
5. Call Failed, Loss of RF uplink (Mobile to Cell)
6. Call Failed, Loss of RF downlink (Cell to Mobile)
7. Call Failed, High BER uplink (Mobile to Cell)
8. Call Failed, High BER downlink (Cell to Mobile)
9. Call Fail, No Resource available
10. Call Fail, Loss of SAT uplink (Supervisory Audio Tone)
11. Call Fail, Loss of SAT downlink Data from billing records can also be used, which can provide information on call duration, switch trunks used, cell and channel information and features such as 3-way calling, call forwarding and voice mail.

The parsed data, or events, are then preferably organized into a common format, which is useful because a cellular system might employ switches made by different manufacturers or because the data that is accessed from different "platforms" may be in inconsistent formats. Thus, in order for the event-to-failure mapping of the present invention to function properly, it is preferable that all relevant events are organized in a common format. Placing the events in a common format may also include step 220, wherein the events are sorted by, for example, the time of the event, the RF channel on which the event occurred, the number of occurrences of the event or a customer's telephone or wireless device identification (ID) number.

At step 225, the parsed and sorted events are then subjected to a predetermined event-to-failure mapping. That is, through experimentation and observation, the present inventor has recognized that certain types of failures can be detected by analyzing the parsed and sorted events extracted from the cellular system infrastructure. Thus, using billing data along with call processing data, for example, one can find instances of cellular telephone calls that last only a short period of time, e.g., 5 to 7 seconds, and which are initiated and ended by the same cellular telephone user. Such short telephone calls can often be attributed to problems with a channel's audio signal. By detecting short calls of this nature and counting how many similar telephone calls that begin and end in such a fashion over a predetermined period of time, it is often possible to correctly predict that a channel's audio signal is about to fail or has already failed.

Other examples of failures that can be gleaned from the appropriate event data include:

(i) bad radio channel based on dropped calls and relevant alarms:

| Counter | Alarm |
| --- | --- |
| Call Failure due to loss of RF Cell 3 Channel 123<br>Dispatch repair engineer | Autotune combiner Fail Cell 3 Channel 123 |

(ii) Tower mounted amplifier failure based on series of dropped calls and appropriate alarms

| Counter | Alarm |
| --- | --- |
| Call Failure due to loss of RF Cell 4 Channel 252<br>Dispatch repair engineer | Power amplifier failure Cell 4 Channel 252 |
| Call Failure due to loss of RF Cell 6 Channel 132 | |
| Call Failure due to loss of RF Cell 6 Channel 149 | |
| Call Failure due to loss of RF Cell 6 Channel 157 | |
| Call Failure due to loss of RF Cell 6 Channel 168 | |
| Call Failure due to loss of RF Cell 6 Channel 196 | |
| Etc . . . | TMA (Tower Mounted Amplifier) Failure Cell 6 |
| Dispatch repair engineer and tower crew | |

(iii) Disturbed audio based on clock alarms.

From customer service or technical support it is possible to learn that a customer is experiencing distorted audio. Alternatively, it is possible to glean such information from billing records, e.g., by detecting many short duration calls. Further, an alarm can be generated indicating there is a problem with a cell site's clock (frequency determining portion of the cell site), which could cause the distorted audio. Ultimately, such a clock problem will result in dropped calls.

The following are additional examples of event-to-failure mappings in accordance with the present invention.

1. One Way or No Audio Call

Billing data 100 shows a short term call followed by normal length call on the same site, but different channel. The billing record also provides channel information, audio trunk information, and calling and called party information.

Blocking statistics (110) can indicate that there were no echo cancellers available for a digital call, which would create a "no audio" problem.

Call processing data 120 could show an abnormal amount of originations on the channel with no audio. This could also lead to higher than normal call failures.

The Cell level counters 130 could show a change in call originations due to a retry to get an audio connection.

On some cellular systems (e.g., Ericsson) there is a pre-check to test the audio path before a call is placed on that channel. If this pre-call check fails an alarm is sent. However, since this pre-call check does not check the RF (Radio Frequency) portion of the audio link, there could still be a failed audio without alarms.

2. Call that Ends Abnormally

Billing records 100 supply the channel assignment, trunk information, disconnect reason, call duration, calling and called parties information.

Blocking statistics 110 need not be accessed in this example.

Call processing data 120 may show hand off information, additional disconnect information, channel information before and after handoff.

Cell level counters 130 indicate if the cell that the call was on is experiencing and an increase in abnormally ending calls. Using trended data it is possible to determine when this started and then use that information to investigate additional billing records and call processing data.

Once the cell is identified, it can be determine if there are any alarms 140 associated with the channels indicated in the billing or call processing data.

3. Calls that Change in Quality During the Call

Billing information 100 can be used to show that a call is being handed off from digital to analog and back to digital very often. This will cause the call audio quality to change. The billing information also identifies which subscriber was involved, what cell sites and what channels.

Blocking statistics 110 may not be necessary in this example.

Call processing data 120 is preferably used to supply information on which cell the anomaly is occurring, signal strengths of the calls, the BER (Bit Error Rate) of the calls, and the S/N (Signal to Noise) ratio on analog calls.

When a change to normal operations on a cell site happens it will result in counters 130 changing. This normal operation is indicated in changes to the counter trending for that cell. The trending may indicate a change in overall signal strength or a change in the average BER.

With tracking indicators from billing, statistical counters and call data a search of alarms 140 for the effected cells is started.

Furthermore, in digital cellular and PCS technologies the mobile phone itself becomes part of the network. Thus, a periodic scan of the data from billing (100) and from call process data (120) may indicate a bad mobile phone that needs to be serviced or replaced.

In the preferred embodiment of the present invention, once a likely or possible failure in the cellular system is detected, a person responsible for tending to or managing the resolution of that particular type of failure is notified by, for example, email, wireless pager or telephone, or other PCS device. Thus, at step 230, the appropriate person or persons is/are identified for those probable failures for which he/they are responsible. An email, or other well-known form of notification is then preferably sent to that person or persons. Thus, the probable failure can be tended to in a timely and efficient manner without first having to send a technician to troubleshoot or without first receiving customer complaints.

At step 235, the personnel who were identified and notified in step 230 preferably also provide feedback to improve or optimize the event-to-failure mapping. For example, a technician may report that not only did the probable failure turn out to be an actual failure, but that another related failure was also detected when the failure was investigated. By adding the related failure to event-to-failure mapping 150, the overall accuracy of the system and method of the present invention is increased.

In the preferred embodiment of the present invention, the aforementioned information and/or data is captured in real or near-real time over a predetermined period of time (e.g., 2, 4, 6 or 8 hours, i.e., preferably less than 24 hours) and analyzed thereafter so that results can be quickly made available to the appropriate personnel. Also, as those skilled in the art will appreciate, there is a vast amount of data that is accessible in the cellular system infrastructure. Thus, in the interest of processing speed, it is preferable to quantize or limit the amount of data that is processed and ultimately subjected to the event-to-failure mapping of the present invention. Moreover, prior art methods of analyzing network operations typically involve reviewing a previous day's data. However, customers expect immediate corrective action when a failure occurs. By performing analysis, i.e., event-to-failure mapping, on predetermined blocks of time that are less than 24 hours, the present invention provides prompt detection of failures and faster failure resolution, as compared to prior art systems and methodologies.

FIG. 3 shows an exemplary email message that is sent to personnel responsible for tending to or resolving cellular system failures. The exemplary email message is directed to an RF channel failure and preferably includes a brief description of the failure along with supporting data that is gleaned from the event data. In FIG. 3, frequency or channel 956 at cell site 90 recorded an error code of Supervisory Audio Tone (SAT) loss with a diagnostic of low signal to noise (S/N) ratio. This error code and diagnostic occurred 247 times in the four hour period from 12:00:00 to 16:00:00 on May 14, 2000. Thus, the person receiving this email is provided all necessary information to dispatch a technician to perform a specific repair job.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is required by the description of the process in the specification.

What is claimed is:

1. A method of detecting failures in a wireless communications network, comprising the steps of:

(a) accessing a platform that stores data indicative of the wireless communications network infrastructure, wherein the step of accessing is performed by a computer that neither wirelessly interacts with nor is part of the wireless communications network infrastructure;

(b) downloading the data to the computer;

(c) parsing the data to extract wireless communications network events;

(d) sorting the events; and (e) subjecting the events in the computer to event-to-failure mapping to identify at least one probable failure.

2. The method of claim 1, wherein the platform comprises at least one of a dynamic RAM and a hard drive.

3. The method of claim 1, wherein the step of accessing comprises employing one of File Transfer Protocol and HyperText Transfer Protocol.

4. The method of claim 1, wherein the data comprises at least one of billing data, blocking statistics, call processing data, call activity counters and alarm information.

5. The method of claim 1, wherein an event is at least one of a blocked call, dropped call, noise, lack of audio and one-way audio.

6. The method of claim 1, further comprising identifying and notifying personnel responsible for correcting the failure.

7. The method of claim 6, wherein the personnel are notified by at least one of wire line telephone, email and wireless pager or telephone.

8. The method of claim 1, further comprising investigating the failure and providing feedback to optimize the event-to-failure mapping.

9. The method of claim 8, comprising dispatching a technician to a cell site.

10. The method of claim 1, wherein the event-to-failure mapping associates a series of multiple short calls with a bad audio channel.

11. The method of claim 1, wherein the event-to-failure mapping associates blocking statistics with one way or no audio calls.

12. The method of claim 1, wherein the event-to-failure mapping associates a combination of events to detect a call that ends abnormally or a call that changes in quality during the duration of the call.

13. A method of detecting failures in a cellular telephone network, comprising the steps of:

(a) remotely accessing a cellular switch that stores data indicative of events that have occurred in the cellular telephone network, wherein the step of remotely accessing is performed by a computer that neither wirelessly interacts with nor is part of the cellular telephone network;

(b) downloading the data to the computer;

(c) parsing the data to extract a predetermined set of events;

(d) sorting the events; and (e) associating one of the events or a series of the events in the computer with a probable cellular network failure.

14. The method of claim 13, wherein the events comprise at least one of a blocked call, a dropped call, noise, lack of audio and one-way audio.

15. The method of claim 13, further comprising recommending that a cellular channel module be replaced in view of the probable cellular network failure.

16. The method of claim 13, wherein the data is downloaded using one of File Transfer Protocol and HyperText Transfer Protocol.

17. The method of claim 13, wherein the events are sorted by one of time of event, RF channel associated with the event, number of occurrences of the event and telephone or ID number.

18. The method of claim 13, further comprising reporting the probable cellular network failure to cellular operations personnel.

19. The method of claim 18, wherein the cellular network operations personnel provide feedback to optimize step (e).

20. A method of detecting or predicting failures in a wireless communications network, comprising the steps of:

(a) using a computer to remotely access a switch that stores data indicative of events that have occurred in the wireless communications network, wherein the computer neither wirelessly interacts with nor is part of the wireless communications network;

(b) downloading the data to the computer;

(c) parsing the data to extract predetermined events;

(d) sorting the events; and (e) associating the events in the computer with a probable cellular network failure.

21. The method of claim 20, wherein step (e) is performed for events that occurred over a predetermined period of time.

22. The method of claim 21, wherein the predetermined period of time is less than 24 hours.

23. The method of claim 21, wherein the predetermined period of time is about 4 hours.

24. The method of claim 20, wherein the data comprises at least one of billing information, blocking statistics, call process data, counters and alarms.

25. The method of claim 20, further comprising reporting the failure to network operations personnel.

26. The method of claim 25, wherein the reporting step comprises sending an email message including an identification of a cell site and the events.

27. A system for detecting failures in a wireless communications network, comprising:

(a) a computer in communication with a platform that stores data indicative of the wireless communications network infrastructure, wherein the computer neither wirelessly interacts with nor is part of the wireless communications network; and (b) an event-to-failure mapping module, wherein the computer is operable to download the data to the computer, parse the data to extract wireless communications network events, and sort the events, and wherein the event-to-failure mapping module is operable to identify at least one probable failure based on the events.

28. The system of claim 27, wherein the platform comprises at least one of a dynamic RAM and a hard drive.

29. The system of claim 27, wherein the data comprises at least one of billing data, blocking statistics, call processing data, call activity counters and alarm information.

30. The system of claim 27, wherein an event is at least one of a blocked call, dropped call, noise, lack of audio and one-way audio.

31. The system of claim 27, wherein the computer is further operable to notify personnel responsible for correcting the failure.

32. A system for detecting failures in a cellular telephone network, comprising:

(a) a computer for remotely accessing a cellular switch that stores data indicative of events that have occurred in the cellular telephone network, for downloading the data, for parsing the data to extract a predetermined set of events and for sorting the events, wherein the computer neither wirelessly interacts with nor is part of the cellular telephone network; and (b) an event-to-failure mapping module, the module being operable to associate one of the events or a series of the events in the computer with a probable cellular network failure.

33. The system of claim 32, wherein the events comprise at least one of a blocked call, dropped call, noise, lack of audio and one-way audio.

34. The system of claim 32, wherein the computer is operable to sort the events by one of time of event, RF channel associated with the event, number of occurrences of the event and telephone or ID number.

35. The system of claim 32, wherein the computer is further operable to report the probable cellular network failure to cellular operations personnel.

36. A system for detecting or predicting failures in a wireless communications network, comprising:

a computer programmed to remotely access a switch that stores data indicative of events that have occurred in the wireless communications network, to download the data, to parse the data to extract predetermined events, to sort the events in the computer and to associate the events with a probable cellular network failure, wherein the computer neither wirelessly interacts with nor is part of the wireless communications network, and wherein the events that are associated with a probable cellular network failure occurred over a predetermined period of time that is less than 24 hours.

37. The system of claim 36, wherein the predetermined period of time is about one of 2, 4, 6 and 8 hours.

38. The system of claim 36, wherein the data comprises at least one of billing information, blocking statistics, call process data, counters and alarms.

* * * * *